United States Patent [19]

Kang et al.

[11] Patent Number: 5,091,200

[45] Date of Patent: * Feb. 25, 1992

[54] PROCESS FOR MICROWAVE BROWNING UNCOOKED BAKED GOODS FOODSTUFFS

[75] Inventors: Young C. Kang, Oakhurst; Chee-Teck Tan, Middletown; Brian Byrne, East Brunswick; Lawrence L. Buckholz, Jr., Middletown; Marion A. Sudol, Boonton; Richard M. Boden, Ocean, all of N.J.

[73] Assignee: International Flavors & Fragrances Inc., New York, N.Y.

[*] Notice: The portion of the term of this patent subsequent to Jan. 15, 2008 has been disclaimed.

[21] Appl. No.: 701,850

[22] Filed: May 17, 1991

Related U.S. Application Data

[60] Continuation-in-part of Ser. No. 596,498, Oct. 12, 1990, which is a division of Ser. No. 535,524, Jun. 8, 1990, Pat. No. 4,985,261, which is a continuation-in-part of Ser. No. 440,794, Nov. 24, 1989, Pat. No. 4,943,697, which is a division of Ser. No. 356,503, May 25, 1989, Pat. No. 4,904,490, and a continuation-in-part of Ser. No. 295,450, Jan. 10, 1989, Pat. No. 4,882,184.

[51] Int. Cl.$^5$ .................................................. A23L 1/00
[52] U.S. Cl. .................................... 426/243; 426/262; 426/296
[58] Field of Search ............... 426/24, 262, 305, 641, 426/99, 296, 496; 219/10.55 M

[56] References Cited

U.S. PATENT DOCUMENTS

| | | | |
|---|---|---|---|
| 407,356 | 9/1886 | Tan et al. | 426/107 |
| 4,518,618 | 5/1985 | Hsia et al. | 426/262 |
| 4,735,812 | 8/1988 | Bryson et al. | 426/262 |
| 4,857,340 | 8/1989 | Parliment et al. | 426/107 |
| 4,882,184 | 11/1989 | Buckholz et al. | 426/243 |
| 4,985,261 | 1/1991 | Kang et al. | 426/243 |

OTHER PUBLICATIONS

Copson et al., "Browning Methods in Microwave Cooking", Agricultural and Food Chemistry, vol. 3, No. 5, May 1955, (pp. 424-427).

Primary Examiner—George Yeung
Attorney, Agent, or Firm—Arthur L. Liberman

[57] ABSTRACT

Described is a process for producing cooked browned baked goods including the steps of:
(a) providing a particulate flowable flavoring powder which contains individually discretly encapsulated Maillard reaction reagents with the reaction reagents being at least one encapsulated amino acid and at least one encapsulated sugar;
(b) providing an uncooked baked goods foodstuff, e.g., dough;
(c) coating the composition of (a) onto the surface of the uncooked foodstuff; and
(d) exposing the flavoring powder coated foodstuff surface to microwave radiation for a period of time to cause the foodstuff to be edible and to be browned whereby the resulting product is caused to be edible as a foodstuff and the baked goods is edibly browned. Optionally, the particulate flowable flavoring powder may be in the form of a slurry with a solvent composition which is capable of raising the dielectric constant of the foodstuff to be cooked whereby the foodstuff to be cooked is completely cooked and edibly browned for a period of time under 600 seconds.

24 Claims, 10 Drawing Sheets

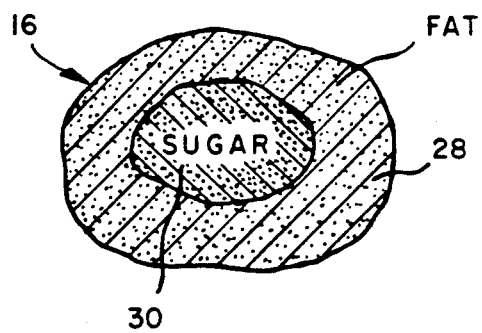
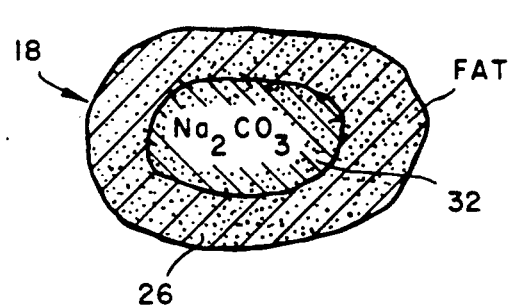
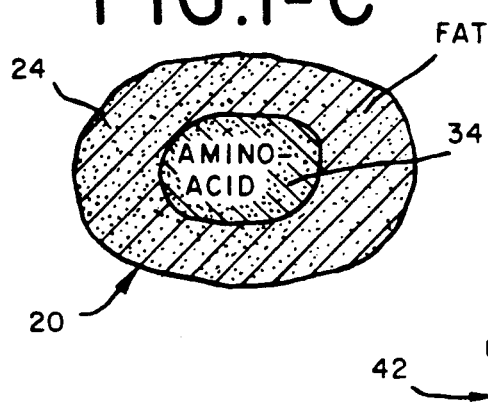
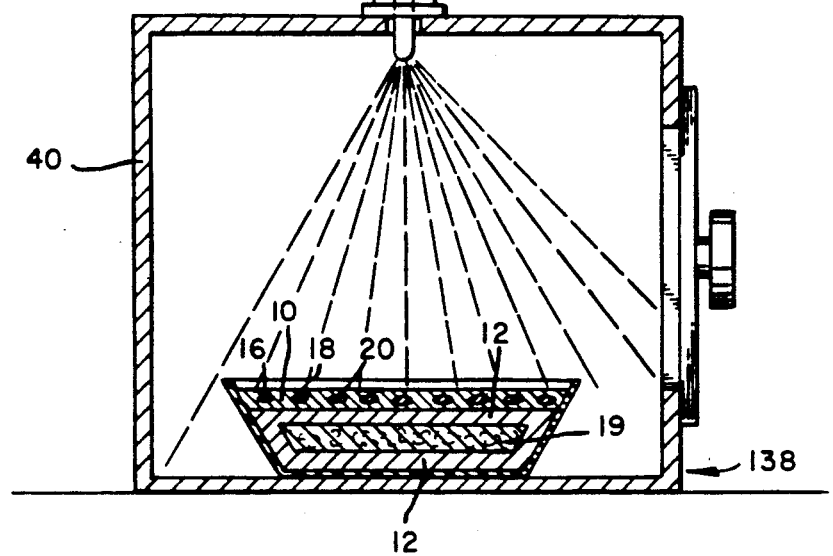

FIG.1-D
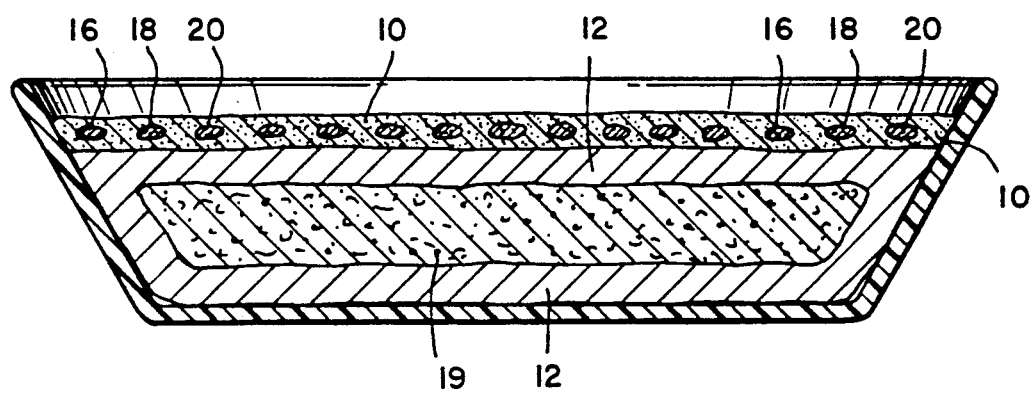
FIG.1-E
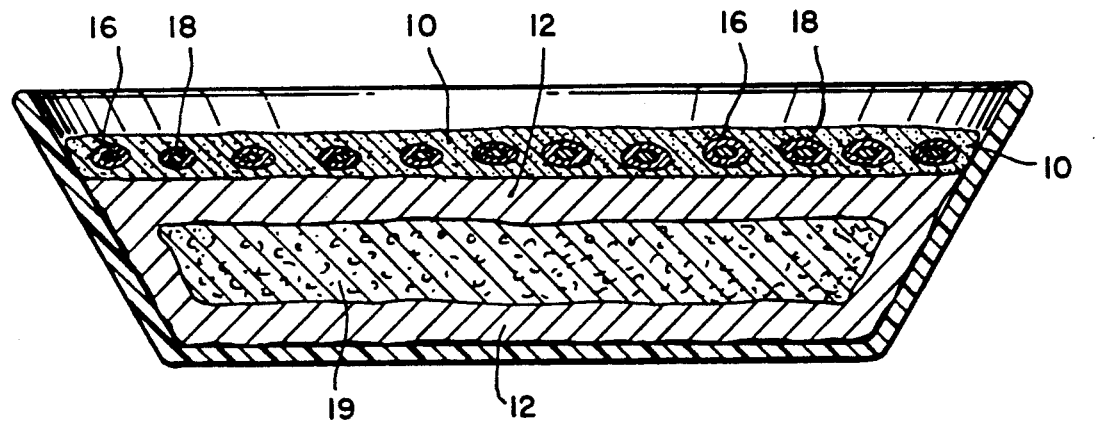

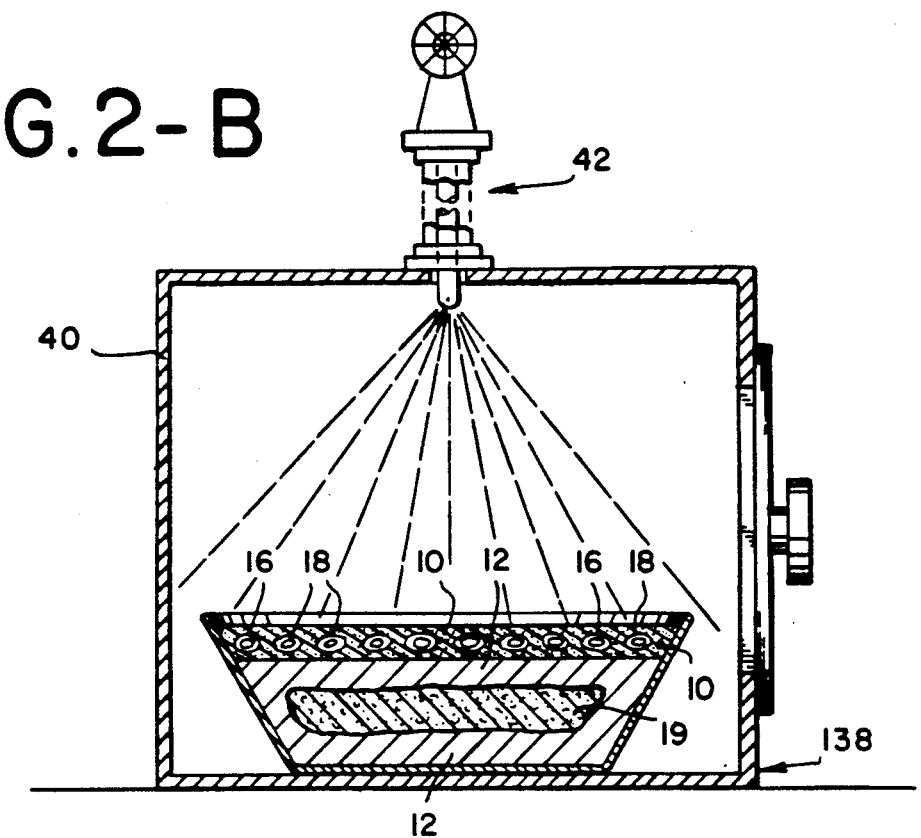
FIG. 2-B
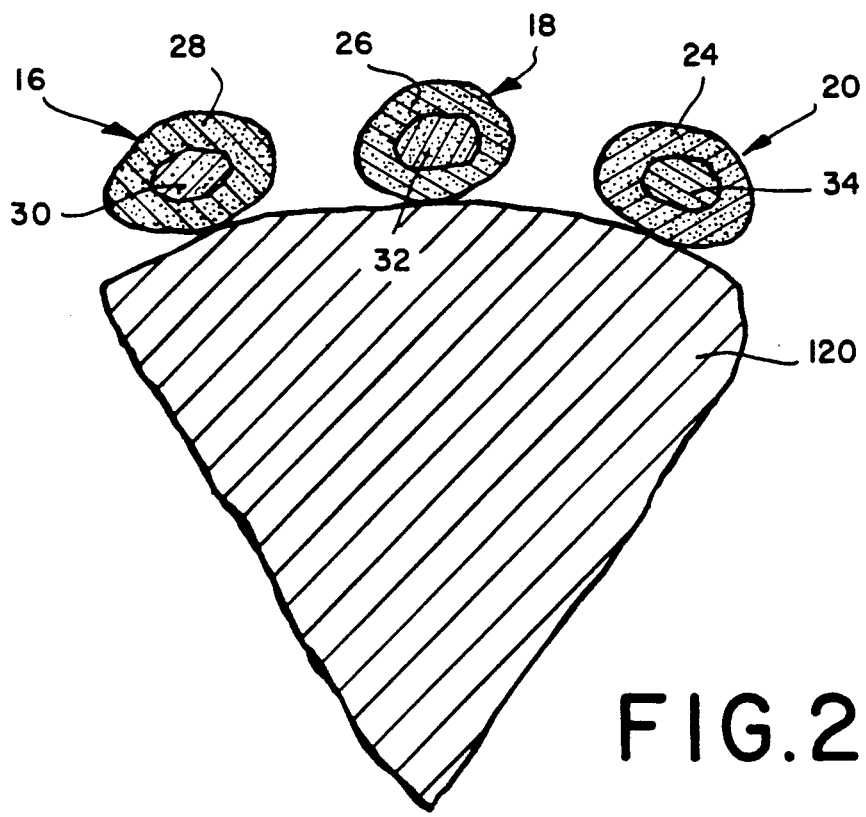
FIG. 2-C

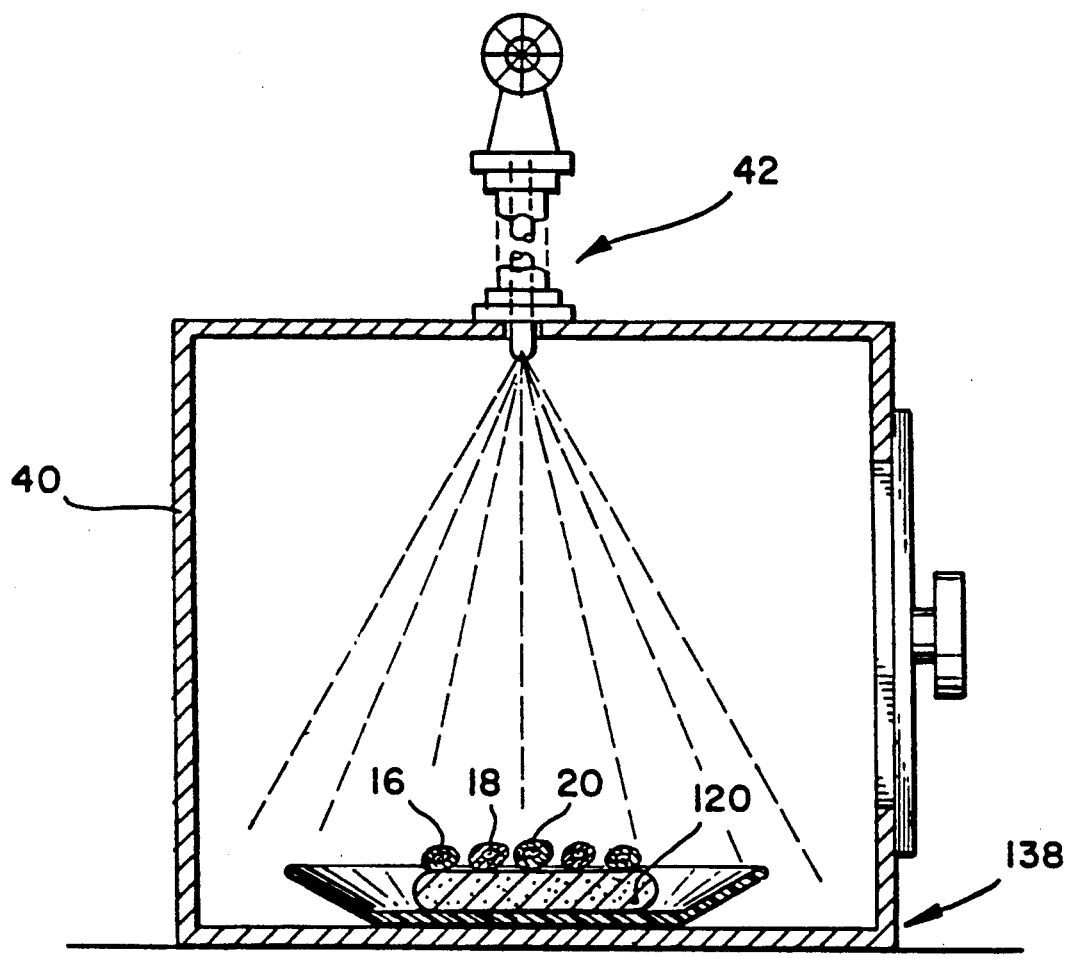
FIG. 2-D

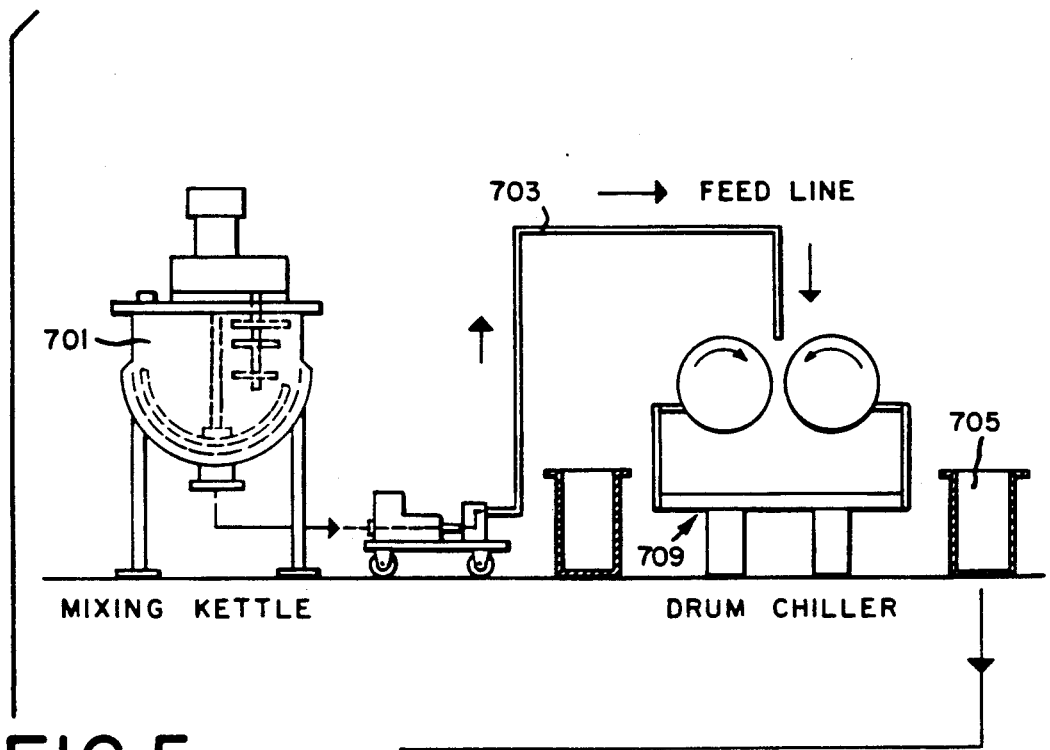
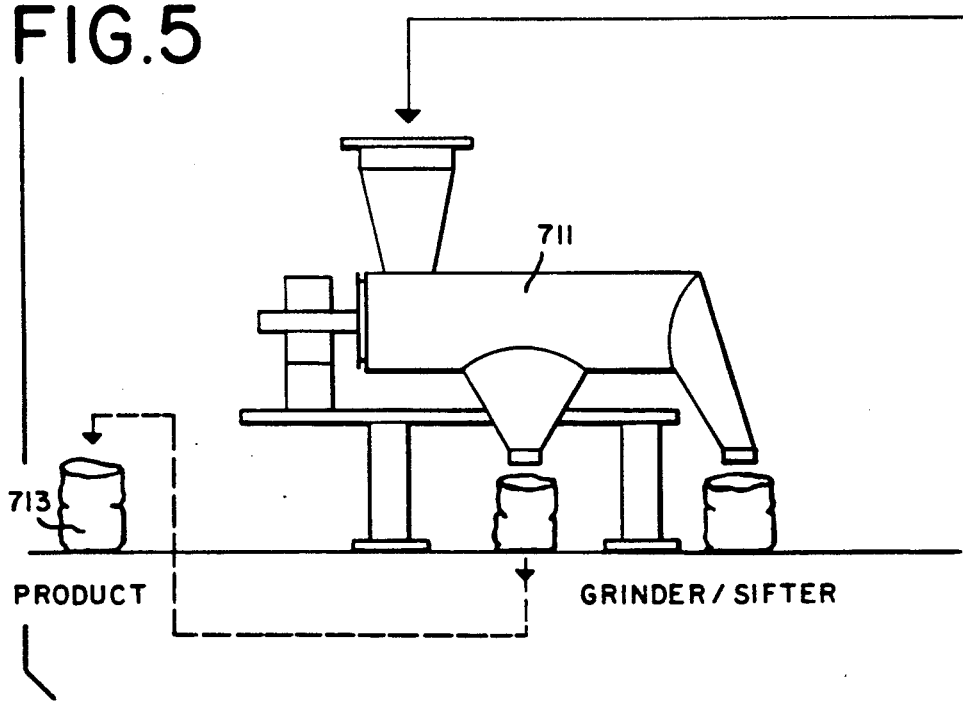
FIG.5

PROCESS FOR MICROWAVE BROWNING UNCOOKED BAKED GOODS FOODSTUFFS

PRIOR APPLICATIONS

This a continuation-in-part of application for United States Letters Patent, Ser. No. 596,498 filed on Oct. 12, 1990, which is a division of application for United States Letters Patent, Ser. No. 535,524 filed on June 8, 1990, now United States Letters Patent 4,985,261 issued on Jan. 15, 1991, which is a continuation-in-part of application for United States Letters Patent, Serial No. 440,794 filed on Nov. 24, 1989, now United States Letters of Patent 4,943,697 issued on July 24, 1990, which is a division of application for United States Letters Patent, Serial No. 356,503 filed on May 25, 1989, now United States Letters Patent 4,904,490 issued on Feb. 27, 1990, and which is a continuation-in-part of application for United States Letters Patent, Ser. No. 295,450 filed on Jan. 10, 1989, now United States Letters Patent 4,882,184 issued on Nov. 21, 1989.

BACKGROUND OF THE INVENTION

The increased use of microwaves for cooking has given rise to a large market in microwavable foods. While the advantage of microwave cooking over convection oven cooking is the time savings, the disadvantage is that certain baked goods (e.g., cookies and pot pies) do not develop the surface browning or crust formation expected with convection oven cooking.

Our objective is to create that browning which enhances the products' appearance, making it look as if it were cooked in a convection oven.

In the microwave, food does not have sufficient time or temperature for the chemicals responsible for browning to react. Therefore, for a microwave browning system to work, it must accelerate the rate of the browning reactions or locally increase the surface temperature. Ultimately, the reactions responsible for browning have to be accomplished in the relatively short time frame dictated by the foods' preparation conditions. The times needed for preparing microwave foods vary depending upon the power output of the microwave unit and the mass of the food to be cooked and the nature of the food to be cooked. A typical 750 watt microwave apparatus will cook baked goods foodstuffs in 6 to 15 minutes.

Several additional requirements for a successful microwave browning system are as follows:
1. In addition to the desired browning effect, it must generate either no aroma or one which is compatible with the target foodstuff;
2. The browning reaction must not take place before cooking the foodstuff;
3. After cooking, the browning must stop, and not darken the foodstuff substantially.

The reactions responsible for browning during convection oven cooking are the caramelization of sugars and the Maillard reaction between naturally occurring reducing sugars, amino acids, amines, peptides and proteins which results in the formation of colored melanoidins. Until recently (1984) there were numerous patent and literature references to such reactions for the production of flavors, where the generation of color was inconsequential or objectionable. In the past few years several patents have appeared wherein microwave browning created by Maillard reactions have been the topic. Thus, Bryson, et al in United States Letters Patent 4,735,812 issued on Apr. 5, 1988 discloses a browning agent particularly for use in microwave cooking comprising collagen or gelatin hydrolyzed to its constituent amino acids plus one or more reducing sugars and alkalis. It is further indicated in Bryson, et al that the collagen preferably is derived from Bovine hides, and that the alkalis are preferably a mixture of sodium carbonate and bicarbonate. It is further indicated that the browning agent may be incorporated into a film or used as a powder or liquid.

Parliment et al, United States Letters Patent 4,857,340 issued on Aug. 15, 1989 discloses a composition of an aroma producing material enrobed in a fusible encapsulating agent, preferably a lipid and in conductive heat transfer relationship with a microwave susceptible material when combined with a microwave comestible or package for providing an aroma when the comestible or package is prepared by subjecting the comestible or package and composition to microwave energy.

Kim et al, "Formation of Volatile Compounds from Maillard Reaction of D-Glucose with DL-Alanine in Propylene Glycol Solution", Han'guk Sikp'um Kwahakhoechi 1988, 20(2), 157–63 (Korea), (Abstracted at Chemical Abstracts Volume 112 at 34512q) discloses volatile compounds produced from the browning reaction of alanine and glucose using propylene glycol as a reaction medium.

Although the prior art does take advantage of the reaction between reducing sugars and amino acids, it has not made any correlation of reaction rates needed for browning reactions with reaction variables such as pH, solvent, or sugar reactivity in connection with browning reactions concerning the surface of baked goods such as cookies and pot pies.

BRIEF DESCRIPTION OF THE DRAWINGS

FIG. 1A is a cut-away side elevation view of an encapsulated Maillard reaction reactant, namely sugar encapsulated in fat.

FIG. 1B is a cut-away side elevation view of an encapsulated Maillard reaction reagent, namely sodium carbonate encapsulated in fat.

FIG. 1C is a cut-away side elevation view of an encapsulated Maillard reaction reagent, namely an amino acid encapsulated in fat.

FIG. 1D is a cut-away side elevation view of a pot pie coated with fluid containing encapsulated Maillard reaction product reactants, prior to cooking.

FIG. 1E is a cut-away side elevation view (in schematic form) of an open pot pie having on its upper outer dough surface a coating of fluid containing encapsulated sugar and encapsulated sodium carbonate but not containing encapsulated amino acid prior to and during the carrying out of the process of our invention.

FIG. 2A is a cut-away side elevation view (in schematic form) of a microwave oven containing a coated pot pie (coated on its dough outer and upper surface with fluid containing encapsulated Maillard reaction product reactants) prior to and during the carrying out of the process of our invention.

FIG. 2B is a cut-away side elevation view (in schematic form) of a microwave oven containing a coated food article of FIG. 1E (coated with fluid containing encapsulated sodium carbonate and separately encapsulated sugar) prior to and during the carrying out of the process of our invention.

FIG. 2C is a cut-away side elevation view of a coated food article section (baked goods) coated with encapsulated Maillard reaction product reactants (with optional pH adjustment agent).

FIG. 2D is a cut-away side elevation view (in schematic form) of a microwave oven containing a coated cookie (coated with encapsulated Maillard reaction product reactants) prior to and during the carrying out of another embodiment of the process of our invention.

FIG. 5 is a flow diagram setting forth in schematic form the apparatus and process steps required in producing drum chilled Maillard reaction product reagents in encapsulated form useful in the practice of the process of our invention.

SUMMARY OF THE INVENTION

Figure 1:
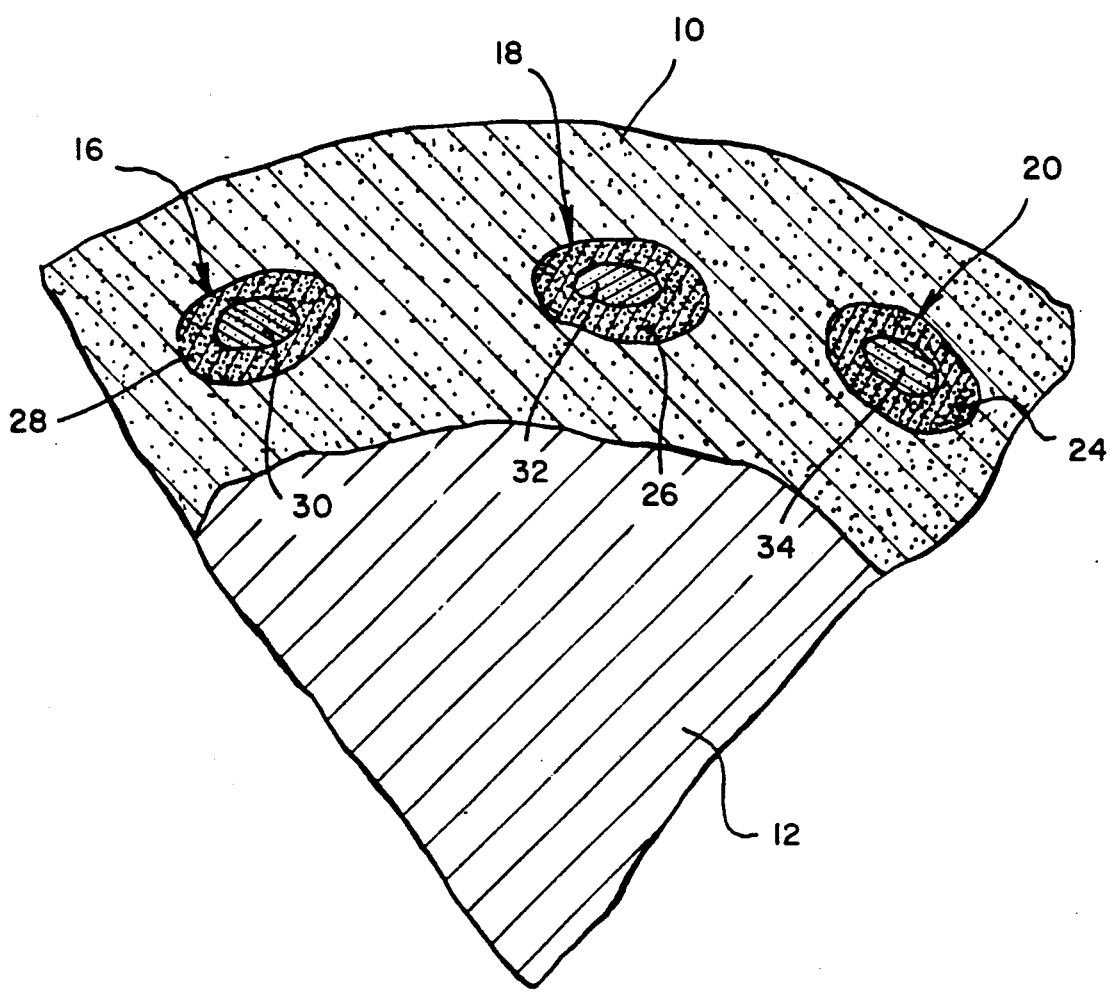
FIG. 1 is a cut-away side elevation view of a slurry-coated food article section coated with a fluid having intimately admixed therewith encapsulated Maillard reaction reagents (with optional pH adjustment agent) prior to carrying out the microwave browning step of the process of our invention.

Our invention is directed to a process for producing a cooked edibly browned storage stable baked goods foodstuff comprising the steps of:
(a) providing a particulate flowable flavoring powder consisting essentially of [A] at least one individually discretly encapsulated Maillard reaction reagent, which Maillard reaction reagent(s) are (is):
   (i) at least one encapsulated sugar optionally admixed with at least one Maillard reaction
   (ii) optionally, at least one encapsulated amino acid and, optionally;
   (iii) at least one encapsulated pH adjustment agent and, optionally [B] at least one Maillard reaction promoter;
(b) providing an uncooked baked goods foodstuff having an outer uncooked baked goods foodstuff surface;
(c) placing in intimate contact with at least a major portion of said uncooked baked goods foodstuff surface a flavor augmenting, imparting or enhancing quantity of said particulate flowable flavoring powder thereby forming a flavoring powder-coated foodstuff surface; and
(d) exposing the flavoring powder-coated foodstuff surface to microwave radiation for a predetermined controlled period of time,
whereby the resulting product is caused to be edible as a foodstuff and the cooked baked goods foodstuff surface is edibly browned.

Our invention is also directed to the optional embodiment of incorporating the particulate flowable flavoring powder in admixture with a liquid whereby a slurry is formed with a solvent composition which is capable of raising the dielectric constant of the baked goods foodstuff to be cooked whereby the foodstuff to be cooked is completely cooked and edibly browned in a period of time under 600 seconds.

Our invention is also intended to encompass a process wherein the particulate flowable flavoring powder is prepared according to a process comprising the steps of:
(i) heating a high melting point normally solid encapsulating material to melt the encapsulating material forming a molten encapsulating agent;
(ii) separately mixing each of the Maillard reaction reagent containing components of the Maillard reaction reagent containing composition with discrete individual portions of the molten encapsulating agent; and
(iii) spray chilling or drum chilling the Maillard reaction reagent containing composition mixture to provide discrete particles of solid Maillard reaction reagent-containing agent.

Our invention is also directed to another embodiment of the aforementioned process wherein the particulate flowable flavoring powder is prepared according to a process comprising:
(i) heating a high melting point normally solid encapsulated material and at least one emulsifier to melt the encapsulating material and emulsifier;
(ii) admixing the melted encapsulating material and emulsifier;
(iii) separately mixing each component of the Maillard reaction reagent containing composition with a textured conditioning agent;
(iv) separately mixing each component of the Maillard reaction reagent containing composition and textured conditioning agent with discrete individual portions of the molten mixture of encapsulating agent and emulsifier to obtain homogeneous mixtures in the form of emulsions;
(v) mixing the resulting emulsions; and
(vi) chilling the resulting Maillard reaction reagent containing composition-.containing mixture to provide discrete particles of solid encapsulated Maillard reaction reagent containing composition.

Our invention is also directed to the products produced according to such process.

With reference to that aspect of our invention involving the utilization of particulate flowable flavoring powder in the form of a slurry with a solvent composition which is capable of raising the dielectric constant of the foodstuff to be cooked, whereby the foodstuff to be cooked is completely cooked and edibly browned in a period of time under 600 seconds a mathematical model useful in relating each of the variables involved in the development of our invention is set forth thusly:

$$\frac{dQ}{d\theta} = \left\{ \frac{R}{K} + \frac{\mu}{\lambda_1 C_p \rho^2 R^3 (T_2 - T_1)} + \frac{1}{h_A} + \lambda_2 \left[ \frac{T_2 - T_1}{T_2^4 - T_1^4} \right] \right\} E^2 \nu \epsilon'$$

In an approximate version an equation for calculating the time of heating as a function of viscosity of the coating (prior to cooking) and further, as a function of the temperature differential between the center of the food article to be cooked and the outer surface of the coating during the microwave browning operation is set forth thusly:

$$\Delta\theta(\text{TIME}) = \frac{\text{TOTAL MICROWAVE ENERGY INPUT, }\Delta Q}{\left( \frac{R}{K} + \frac{\mu}{\lambda_1 C_p \rho^2 R^3 (T_2 - T_1)} + \frac{1}{h_A} + \lambda_2 \left[ \frac{T_2 - T_1}{T_2^4 - T_1^4} \right] \right) E^2 \nu \epsilon'}$$

wherein the terms $\Delta Q$ is the total microwave energy input during the process of our invention;

$$\frac{dQ}{d\theta}$$

is the rate of heat input equivalent to the rate of energy use by the microwave oven;

R is the effective radius of the food article being cooked;

K is the heat transfer coefficient of the food article being cooked (the solid material);

$\mu$ is the viscosity of the coating immediately prior to cooking;

$\lambda_1$ is a proportionality constant which is a function of the coating thickness immediately prior to cooking and the geometry of the article being cooked as well as the geometry of the microwave oven;

$C_p$ is the heat capacity of the coating immediately prior to cooking;

$\rho$ is the density of the liquid coating immediately prior to

T1 is the temperature at the center of the food article being cooked;

T2 is the temperature at the outer surface of the food article being cooked;

$h_A$ is the convection heat transfer coefficient for the air layer surrounding the food article being cooked;

$\lambda_2$ is the proportionality constant for radiation term for concentric spheres (the coating surrounding the uncooked food);

E is the electric field strength;

V is the frequency;

$\epsilon^1$ is the relative dielectric constant of coating material; and $\Delta\theta$ is the time of the microwave cooking.

The foregoing equations were derived from equations set forth in:

"Heat Transfer and Food Products", Hallstrom, et al, Elsevier Applied Science Publishing Company, 1988;

"Principals of Chemical Engineering", Walker, et al, Third Edition, McGraw Hill Book Company, 1937; and "Chemical Engineer's Handbook", Fifth Edition, Perry and Chilton, McGraw Hill Book Company, pages 10—10, 10–11 and 10–12.

Our invention is also intended to cover apparatus for carrying out the aforementioned process which apparatus consists essentially of:

(i) separate encapsulating means for encapsulating Maillard reaction reagents to produce separate batches of capsules each containing an individual Maillard reaction reagent;

(ii) mixing means for mixing the separate batches of capsules to form a single batch of flowable capsules;

(iii) coating means for coating the said batch of capsules prepared using said mixing means onto an uncooked baked goods foodstuff said coating means being downstream from said mixing means; and (iv) microwave cooking means downstream from said coating means to cook the coated uncooked baked goods foodstuff whereby its surface is edibly browned and it becomes cooked and storage stable.

Another embodiment of the apparatus of our invention consists essentially of:

(i) separate encapsulating means for encapsulating Maillard reaction reagents to produce separate batches of capsules, each capsule including an individual Maillard reaction reagent;

(ii) first mixing means for mixing the separate batches of capsules to form a single batch of flowable capsules;

(iii) second mixing means downstream from said first mixing means for mixing said batch of flowable capsules with a solvent composition which is capable of raising the dielectric constant of a foodstuff to be cooked, whereby the foodstuff to be cooked is completely cooked and edibly browned in a period of time under 600 seconds, said second mixing means capable of handling a slurry consisting of said solvent and said flowable capsule;

(iv) coating means for coating the slurry prepared in using said second mixing means onto uncooked baked goods foodstuffs; and (v) microwave cooking means downstream from said coating means to cook the coated uncooked baked goods foodstuff whereby said foodstuff becomes cooked edibly browned and storage stable.

Preferred encapsulating materials have melting points of from about 130° F. up to about 195° F. and are more preferably fats or waxes having such melting points. Desirably, the encapsulating material is a hydrogenated or partially hydrogenated vegetable oil, stearate, a fatty glyceride ester or partial ester or a edible wax. More particularly the encapsulating agent is preferably a partially hydrogenated cottonseed oil, a partially hydrogenated soybean oil, a partially hydrogenated palm oil, a glycol monostearate, a glycerol monopalmitate, a propylene glycol monostearate, a polyglycerol stearate, a polyoxyethylene sorbitol, a fatty acid ester of polyoxyethylene sorbitan, a polyglycerol ester of fatty acid, bees wax, carnauba wax, paraffin wax or candellila wax.

When a texture conditioning agent is used, it is preferred that the quantity of textured conditioning agent is from about 0.1 up to about 1 times the amount of Maillard reaction reagent containing composition used.

When the encapsulation process is spray chilling, it is preferred that the homogeneous mixtures chilled by spraying the mixture into a stream of gas with the gas being preferred to have a temperature of from about 40° F. up to about 116° F. It is further preferred that the spraying be carried out using a centrifugal atomizer. It is further preferred that the homogeneous mixture be admixed with compressed air and sprayed through a nozzle. Furthermore, the mixture may be chilled by contact with a surface at a temperature less than the melting point of the encapsulating material to form flakes; and it is preferred that the flakes are reduced in size to pass through a number 10 screen prior to further use.

When using a solvent to form a slurry of capsules, the solvent is preferred to be glycerine, propylene glycol, mixtures of glycerine and propylene glycol from one part glycerine up to 99 parts propylene glycol down to 99 parts glycerine to 1 part propylene glycol, mixtures of glycerine and ethanol wherein the ethanol:glycerine ratio is from 50 parts ethanol:50 parts glycerine down to 1 part ethanol:99 parts glycerine and mixtures of propylene glycol and ethanol wherein the ratio of propylene glycol:ethanol is from 50 parts propylene glycol:50 parts ethanol down to 99 parts propylene glycol:1 part ethanol. Water may also be used as is or an admixture with propylene glycol or glycerine when using in addition to the sugar as set forth, infra, an additional amount of fructose whereby the amount of fructose is at least 40% by weight of the Maillard reaction composition.

It is preferred that the sugar reactant in the Maillard reaction product reagent composition is one of the following sugars:
Rhamnose;
Xylose;
Arabanose;
Ribose;
Fructose; and
Glucose.

Furthermore, it is preferred that the amino acid reactant in the Maillard reaction reagent composition is one of the following amino acids:
Proline;
Lysine;
Arginine;
Cysteine
Methionine;
Yeast Extract; and
Hydrolyzed Vegetable Protein.

Furthermore, the amino acid component for the Maillard reaction reagent composition need not come from the encapsulated reaction mass but may come from the baked goods uncooked dough itself. The baked goods uncooked dough contains amino acids which are generated particularly during the microwave cooking operation. These amino acids come to the surface and react with encapsulated sugar, particularly when a pH adjustment such as sodium carbonate and a reaction promoter is present on the surface of the baked goods foodstuff.

Furthermore, it is also preferred that the Maillard reaction reagent particles be reduced in size to pass through a 100 mesh screen prior to their being encapsulated.

A Maillard reaction promoter such as polyvinyl pyrrolidone, may, optionally be encapsulated along with the sugar prior to being placed on the surface of the baked goods prior to microwave cooking.

Furthermore, the Maillard reaction promoter such as polyvinyl pyrrolidone may be separately added to the encapsulated Maillard reaction reagent composition prior to coating on the baked goods foodstuff prior to microwave cooking.

In one aspect of our invention each of the browning precursors (Maillard reaction product reagents) are individually incorporated into a controlled release system prior to coating onto the baked goods foodstuff to be cooked via microwave cooking. Thus, for example, the amino acid precursor or mixture of amino acid precursors are admixed with a fat in a weight ratio of from 1 part amino acid precursor to 2 parts fat down to 1 part fat composition to 2 parts precursor composition. The resulting mixture is drum chilled as more specifically set forth in the examples, infra. The drum chilled product is then admixed with a similarly formed drum chilled or spray chilled encapsulated sugar and similarly formed drum chilled or spray chilled encapsulated sodium carbonate. The resulting mixture is then either admixed with a solvent as set forth, supra, or per se coated onto a baked goods foodstuff, e.g., a preformed, uncooked cookie or the upper surface of a pot pie.

The resulting product is then placed in a microwave oven and the microwave oven is maintained in heating mode for a period of at least 6 minutes. The resulting product is edibly browned and has substantially entire flavor retention.

DETAILED DESCRIPTION OF THE DRAWINGS

Referring to the drawings, FIG. 1 is a cut-away side elevation view of a slurry-coated food article section 12 coated with a fluid such as glycerine 10 having intimately admixed therewith encapsulated Maillard reaction reactants with optional pH adjustment agent prior to carrying out the microwave browning step of the process of our invention.

Thus, the solvent composition 10 is capable of raising the dielectric constant of the foodstuff 12 to be cooked whereby the foodstuff 12 to be cooked is completely cooked and edibly browned in a period of time of from 6 to 15 minutes (under 900 seconds and preferably under 600 seconds). The solid components of the slurry have been previously encapsulated according to the processes as set forth in FIGS. 3, 4 and 5. More specifically, the particle indicated by reference numeral 16 is a fat encapsulated sugar particle with the fat being indicated by reference numeral 28 and the sugar being indicated by reference numeral 30. This particular particle is also shown in detailed cross-section form in FIG. 1A. Furthermore, the particle indicated by reference numeral 18 is a fat encapsulated sodium carbonate particle with the fat indicated by reference numeral 26 and the sodium carbonate indicated by reference numeral 32. The sodium carbonate is a pH adjustment agent for the Maillard reaction which is carried out during the microwave heating. Similarly, the particle indicated by reference numeral 20 is a fat encapsulated amino acid particle with the amino acid itself being indicated by reference numeral 34 and the fat encapsulating the amino acid being indicated by reference numeral 24.

FIG. 1D is the cross section of a pot pie having an upper surface of dough 12 coated with fluid (indicated by reference numeral 10) containing encapsulated Maillard reagent reactants. The particles set forth in FIGS.

1A, 1B and 1C are once again repeated using the same reference numerals in FIG. 1D. Thus, reference numeral 10 indicates the solvent such as glycerine or a mixture of propylene gylcol and glycerine or water. Reference numeral 16 indicates the encapsulated sugar. Reference numeral 18 indicates the encapsulated sodium carbonate. Reference numeral 20 indicates the encapsulated amino acid. Reference numeral 12 indicates the upper crust (uncooked) of dough on which the slurry is coated. The same pot pie is set forth in schematic form in FIG. 2A.

Thus, FIG. 2A is a cut-away side elevation view (in schematic form) of a microwave oven indicated by reference numeral 138 containing a coated food article of the type set forth in cross-section form in FIG. 1D and FIG. 1E. The food article having the slurry coated on the uncooked pot pie foodstuff 12 is contained in microwave oven 138, more specifically in box 40 wherein microwave source 42 emits energy substantially perpendicular to the upper surface of the food article. The microwave energy passes through the coating surface and causes the reaction in the coating which contains solvent 10 and encapsulated Maillard reaction reagent reactants 30 and 34 to take place whereby Maillard reaction products are produced. The solvent 10 heats up and activates the molecules of the reactants 30 and 34. Simultaneously, the solid baked goods foodstuff dough 12 is heated and the coating containing the solvent 10 is adsorbed through the surface of the upper crust of the baked goods foodstuff into the outer interstices of the pot pie crust 12. Prior to 900 seconds (preferably 600 seconds) the entire pot pie product is cooked and the surface coating now containing the Maillard reaction product is substantially adsorbed into the outer interstices of the pot pie upper crust.

The pot pie rests at point 39 in box 40.

In view of the fact that the pot pie article prior to cooking contains more than 50% water, the use of the solvents such as glycerine or mixtures of glycerine and propylene glycol or mixtures of propylene glycol and ethanol is not necessary (although use of such a solvent is preferred); and use of such a solvent is primarily preferred when using a cookie as opposed to a pot pie). Thus, referring to FIG. 1E, FIG. 1E is a cross section view of a pot pie wherein the crust 12 carries on it solvent 10 containing capsules 16 and 18; capsule 16 being encapsulated sugar and capsule 18 being encapsulated sodium carbonate. Reference numeral 19 is indicative of the filling within the pot pie. On cooking amino acids from crust 12 diffuse into coating 10 and react with the sugar particles 16 to carry out the Maillard reaction. Accordingly, in FIG. 1E no amino acid which is encapsulated is shown nor is it needed.

Referring to FIG. 2C, FIG. 2C is a cut-away side elevation view of a coated food article coated with encapsulated Maillard reaction product reagents with optional pH adjustment agent. The baked goods food article is indicated by reference 120. The encapsulated sugar is indicated by reference numeral 16 with the actual sugar being indicated by reference numeral 30 and the fat encapsulating agent being indicated by reference numeral 28. The encapsulated pH adjustment agent, sodium carbonate is indicated by reference numeral 18 with the actual sodium carbonate particle being indicated by reference numeral 32 and the fat encapsulating agent being indicated by reference numeral 26. The amino acid reactant is indicated by reference numeral 20 with the actual amino acid particle being indicated by reference numeral 34 and the fat encapsulating agent being indicated by reference numeral 24 Again, the fat encapsulation is carried out by using the processes of FIGS. 3, 4 and 5.

FIG. 2D is a cut-away side elevation view (in schematic form) of a microwave oven 138 containing a coated food article (of FIG. 1E) prior to and during the carrying out of the process of our invention, wherein the coating is of the type set forth in detail in FIG. 1E.

A cookie 120 is coated with capsules 16, 18 and 20 as shown in FIG. 2C. The uncooked dough is contained in microwave oven 138, more specifically in box 40 wherein microwave source 42 emits energy substantially perpendicular to the upper surface of the food article (cookie 120). The microwave energy passes through the surface of the cookie and causes the reaction to take place (aided by the evolution of water vapor from the cookie 120) whereby Maillard reaction products are produced. The water in the cookie 120 heats up and activates the molecules of the reactants in capsules 16, 18 and 20. Simultaneously, the cookie dough 120 is heated and the Maillard reaction products are adsorbed through the surface thereof into the outer interstices of the cookie product 120. Prior to 900 seconds (preferably 600 seconds and even less) the entire cookie is cooked and the surface coating now containing the Maillard reaction product is substantially adsorbed into the outer interstices of the cookie 120. The food article rests at point 39 in box 40.

Figure 3:
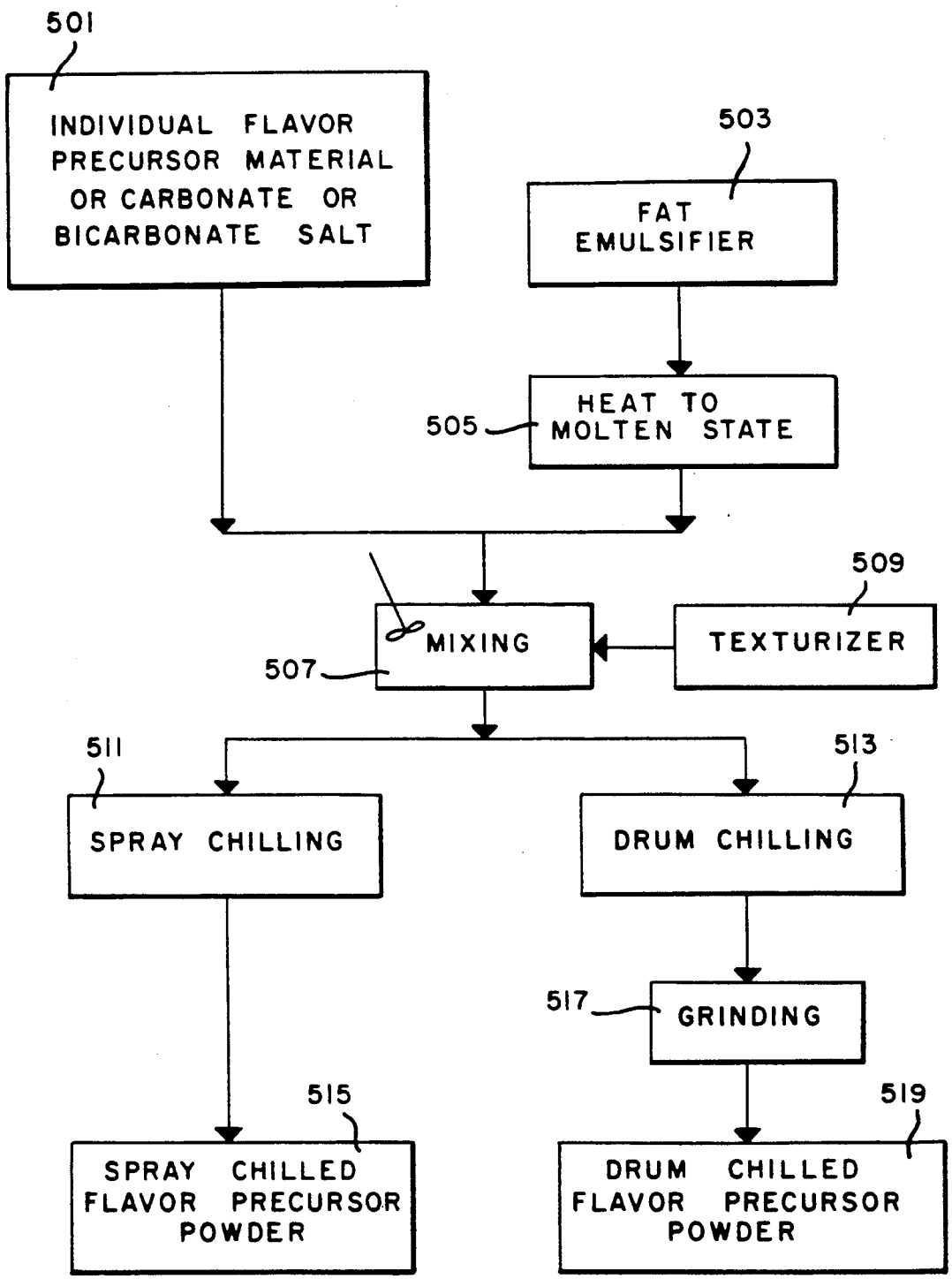
FIG. 3 is a block flow diagram showing the steps, in schematic form for carrying out the process for forming drum chilled Maillard reaction product reactants in encapsulated form and spray chilled Maillard reaction product reactants in encapsulated form useful in the practice of the process of our invention.

FIG. 3 sets forth a schematic block flow diagram of the process for producing spray chilled Maillard reaction reagent containing powder or drum chilled Maillard reaction reagent containing powder useful in forming material for incorporation into the interstices of the uncooked baked goods product during cooking.

Individual Maillard reaction reagent taken optionally with pH adjustment material (e.g. sodium carbonate or sodium bicarbonate, for example) in location 501 is admixed with molten fat from location 505 (optionally admixed with fat emulsifier from location 503) with the mixing taking place in mixing means 507 together, optionally, with texturizer from location 509.

The resultant mixture created at mixing means 507 may then either be spray chilled at location 511 or drum chilled at location 513. The spray chilled precursor product at location 515 is then admixed with additional spray chilled precursor product (for example, spray chilled encapsulated amino acid is admixed with spray chilled encapsulated sugar) which may further be admixed with spray chilled sodium carbonate.

The drum chilled product from location 513 is ground at location 517 yielding individual drum chilled precursor powder The drum chilled precursor, for example, drum chilled encapsulated amino acid may then be admixed with drum chilled or spray chilled encapsulated sugar which may further be admixed with drum chilled or spray chilled pH adjustment agent such as encapsulated sodium carbonate or encapsulated sodium bicarbonate.

Samples of fatty materials useful in this process are set forth supra and their respective melting points are as follows:

TABLE I

| Fatty Material | Melting Point Range |
| --- | --- |
| Partially hydrogenated cotton seed oil | 141–147° F. |
| Partially hydrogenated | 152–158° F. |

TABLE I-continued

| Fatty Material | Melting Point Range |
| --- | --- |
| soybean oil | |
| Partially hydrogenated palm oil | 136–144° F. |
| Mono and diglycerides | 136–156° F. |
| Glycerol monostearate | 158° F. |
| Glycerol monopalmitate | 132° F. |
| Propylene glycol monostearate | 136° F. |
| Polyglycerol stearate | 127–135° F. |
| Polyoxyethylene sorbitol beeswax derivatives | 145–154° F. |
| Polyoxyethylene sorbitan esters of fatty acids | 140–144° F. |
| Sorbitan monostearate | 121–127° F. |
| Polyglycerol esters of fatty acids | 135–138° F. |
| Beeswax | 143–150° F. |
| Carnauba wax | 180–186° F. |

Texturizers include precipitated silicon dioxide, for example, SIPERNAT® 50S (bulked density 6.2 pounds foot; particle size 8 microns; surface area 450 square meters per gram manufactured by the Degussa Corporation of Teterboro, N.J. Other silicon dioxide texturizers are as follows:

SIPERNAT® 22S manufactured by Degussa Corporation;

ZEOTHIX® 265 manufactured by J. M. Huber Corporation of Havre de Grace, Md.;

CAB-O-SIL® EH-5 manufactured by the Cabot Corporation, of Tuscola, Ill.

Figure 4:
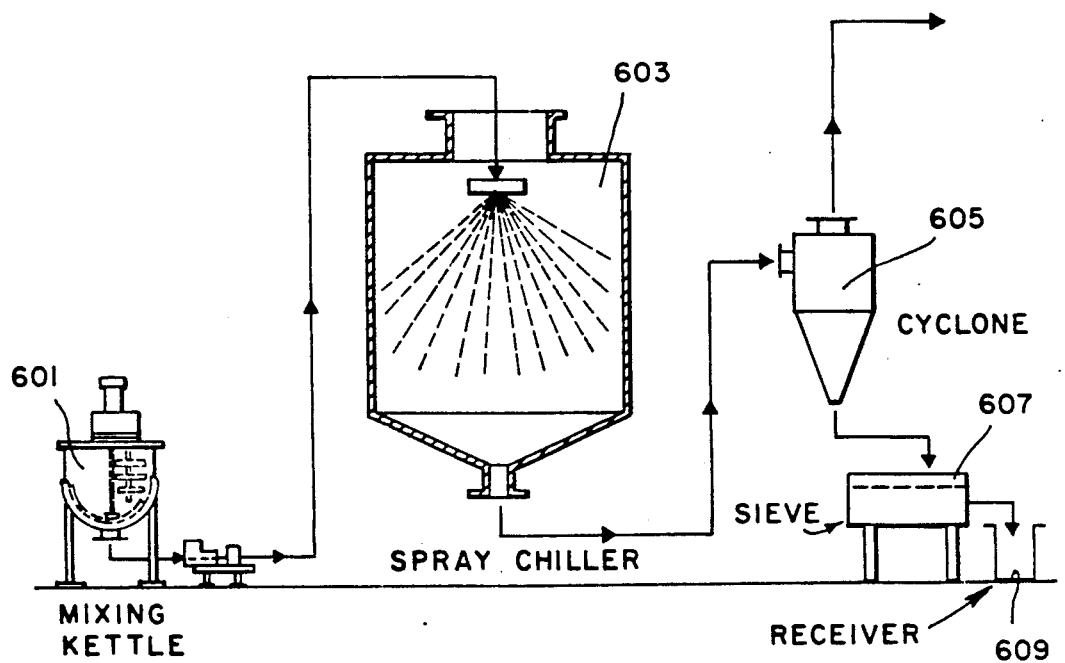
FIG. 4 is a schematic diagram setting forth apparatus and process steps useful in forming spray chilled Maillard reaction product reactant flavor precursors (in encapsulated form) useful in the practice of the process of our invention.

FIG. 4 is a diagram of the process and apparatus (in schematic form) for producing spray chilled Maillard reaction precursor powder useful in the process of our invention (which powder may additionally contain Maillard reaction promoter and pH adjustment agent). Maillard reaction precursor materials, fat emulsifier in molten state and texturizer are admixed in mixing kettle 601. The resulting mixture is spray chilled in spray chiller 603 and the resulting spray chilled particles containing Maillard reaction precursor and optionally pH adjustment agent and optionally Maillard reaction promoter are classified. The classification is carried out in cyclone separator 605 with the larger size particles which are useful in the practice of our invention going through seive 607 into receiver 609.

More specifically, the molten mixture maintained in the fluid state is pumped to the "spray chiller" which is actually a spray dryer and atomized into fine droplets using an atomizer. A nozzle may be specifically engineered to exclude chilled air or chilled air may be utilized to solidify the resulting fat particles. Atmospheric unheated air may be used to blow through the spray dryer. The final product collected is in fine powder form with particles about 50–120 microns in size.

FIG. 5 is a schematic diagram setting forth a process and apparatus useful in preparing drum chilled Maillard reaction reagent powder (additionally containing Maillard reaction promoter and Maillard reaction pH adjustment agent) useful in carrying out the process of our invention, wherein the resulting powder separately contains amino acid, sugar and pH adjustment agent. Each of these materials is produced in a separate step.

The Maillard reaction reagent precursor material, for example, the amino acid arginine is admixed with molten fat and emulsifier (optional) and texturizer (optional) in mixing kettle 701. The molten material is then pumped through feed line 703 into drum chiller 709. The resulting drum chilled product collected at location 705 is passed into grinder/sifter 11 and then collected at location 713.

An example of a grinder/sifter useable in the instant invention is the KEMUTEC BETAGRIND®. Another example of workable apparatus is the KEK-Gardner Centrifugal Sifter.

Figure 6:
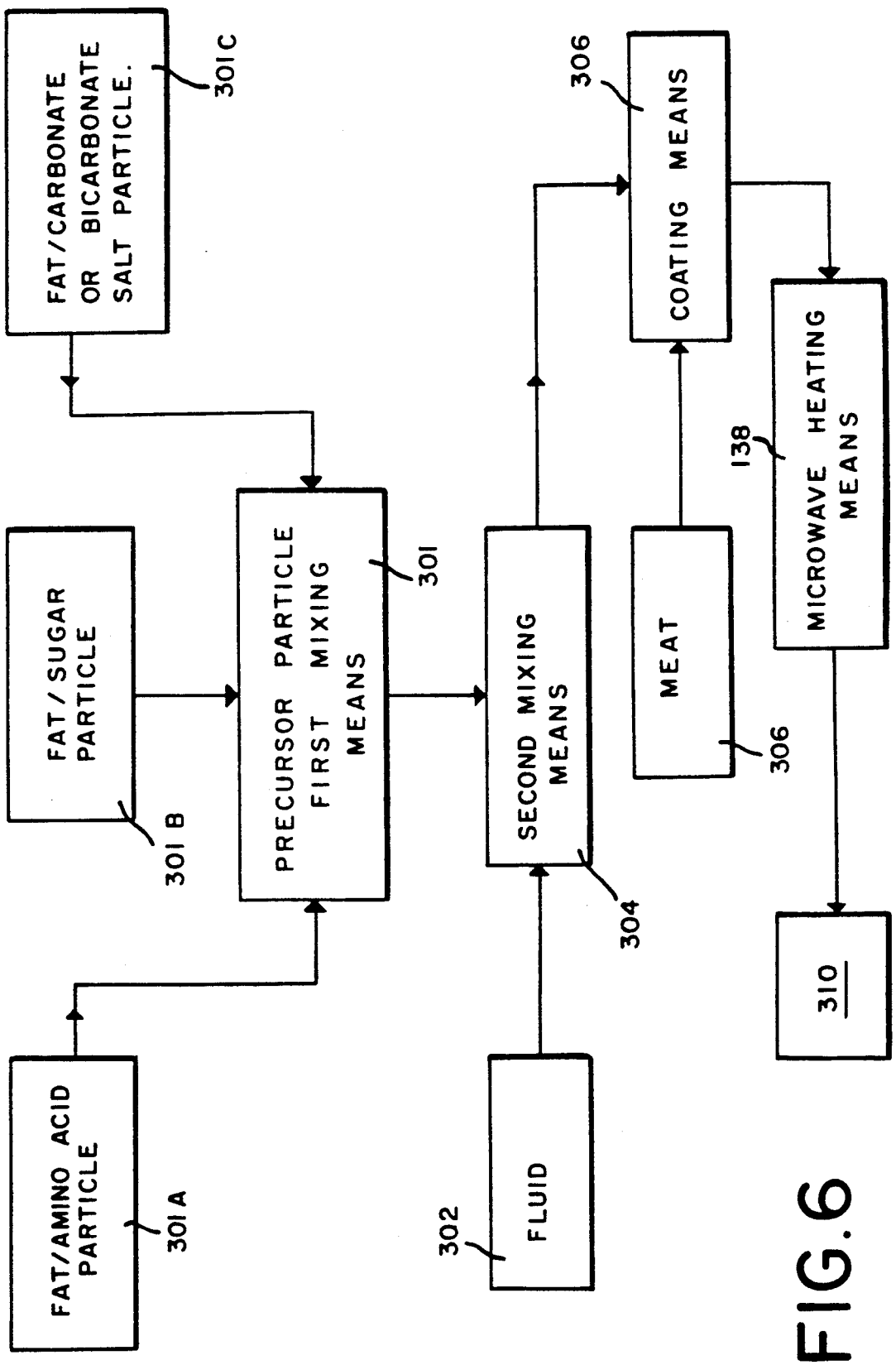
FIG. 6 is a block flow diagram showing the steps, in schematic form, for carrying out the process of our invention and indicating the multiple means (apparatus elements) useful in carrying out the process of our invention whereby an uncooked baked goods food article (e.g., open face pot pie) is coated with encapsulated Maillard reaction product reagents, individually, in slurry form, prior to microwave heating.

FIG. 6 sets forth a schematic block flow diagram of the process of our invention whereby fluid, e.g., glycerine located at 302 and encapsulated Maillard reaction reagents from location 301 are mixed at second mixing means 304. The resulting slurry is utilized at coating means 306. Baked goods product, e.g., a pot pie uncooked from location 306 is coated at coating means 306 and then placed into microwave heating means 138 where the baked goods product is cooked for a period of time less than 900 seconds (preferably less than 600 seconds) and transported for marketing to location 310. The precursor particle materials are individually produced according to the processes shown in FIGS. 3, 4 and 5, supra, and are shown as individual particles coming from locations 301A, 301B and 301C. Thus, for example, encapsulated amino acid particles produced according to the process of FIG. 5 are located at location 301A. Encapsulated sugar particles produced according to the process of FIG. 4 are located at location 301B. Encapsulated pH adjustment agents such as fat encapsulated sodium carbonate or fat encapsulated sodium bicarbonate at location 301C are produced according to the process of FIG. 4.

Figure 7:
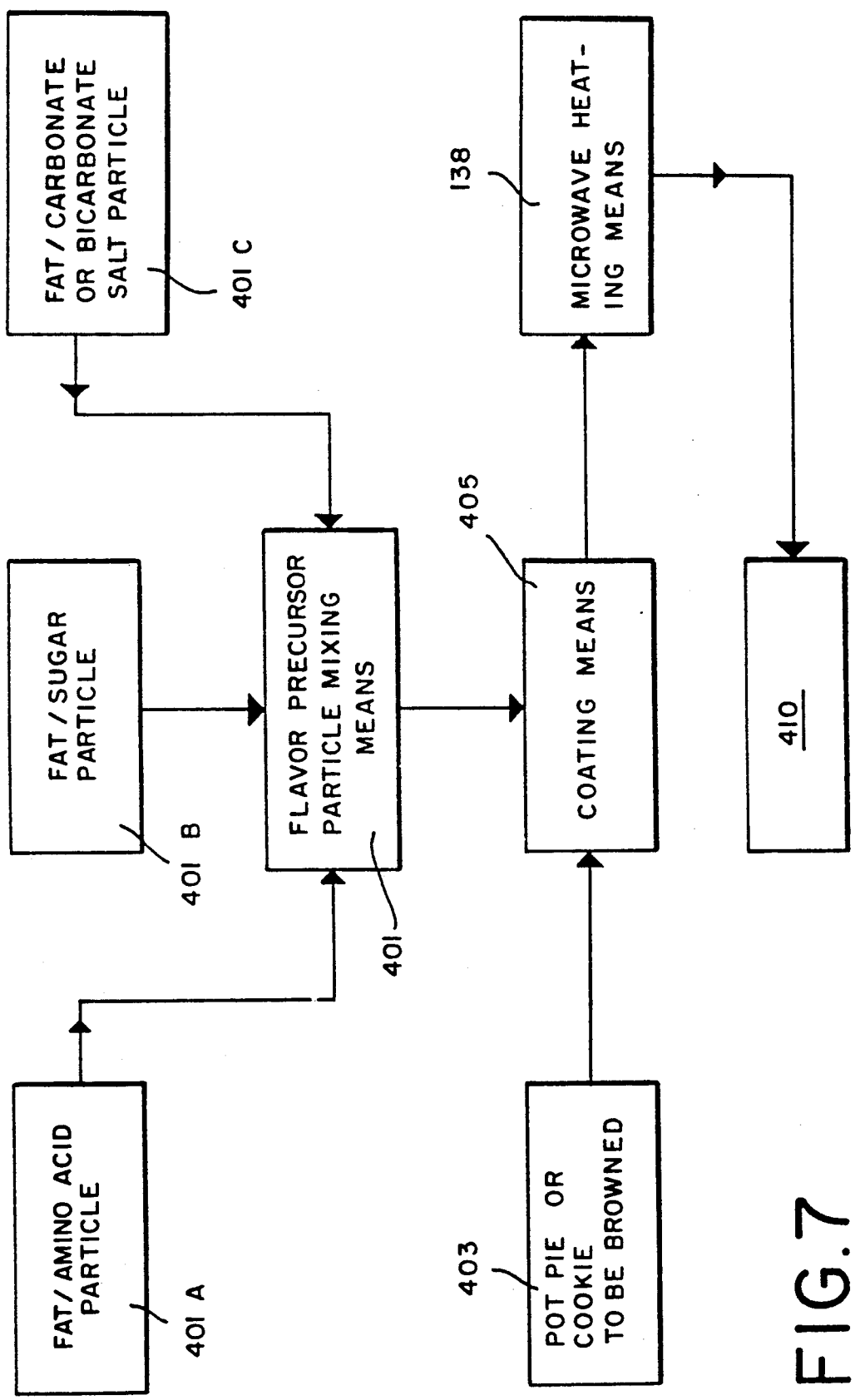
FIG. 7 is a block flow diagram showing the steps, in schematic form, for carrying out another aspect of the process of our invention and indicating the multiple means (apparatus elements) useful in carrying out that aspect of the process of our invention whereby browning precursor powder (encapsulated Maillard reaction product reagents) is applied to a portion of the surface of the uncooked baked goods food article prior to microwave heating.

FIG. 7 sets forth the schematic block flow diagram of another aspect of the process of our invention whereby Maillard reaction reagent precursor powder, for example, drum chilled fat encapsulated amino acid from location 401A (produced according to the process of FIG. 5), spray chilled fat encapsulated sugar from location 401B (produced according to the process of FIG. 4) and drum chilled fat encapsulated pH adjustment agent (sodium carbonate or sodium bicarbonate) from location 401C (produced according to the process of FIG. 5) are admixed in flavor precursor particle mixing means 401. The resulting mixture is then coated onto a baked goods (e.g., cookie) from location 403 at coating means 405. The coated baked goods from location 405 is placed into microwave heating means 138 where microwave cooking takes place and the foodstuff to be cooked is completely cooked and edibly browned for a period of time under 900 seconds (preferably under 600 seconds). The resulting cooked articles are then transported for marketing to location 410.

It should be noted that an additional advantage achieved in practicing our invention wherein the flavor precursor liquid composition is coated unto uncooked baked goods foodstuff is that water evaporation is retarded when the resulting coated product is cooked in a microwave oven. This advantage, too, is unexpected, and unobvious and advantageous.

The principles given above are illustrated in the following examples:

EXAMPLE I

Formation of Spray Chilled Fat Encapsulated Xylose

Twelve hundred grams of xylose is admixed with 540 grams of 30% MYVEROL® 1806 and 1260 grams of DURKEE 07® fat.

The spray chilling operation is carried out in accordance with the apparatus described for FIG. 4. The mixing is carried out in mixing kettle 601. The run time is 15 minutes. The yield is 1080 grams. The feed pump flow rate is 6.5 grams per minute.

Similarly fat encapsulated lysine and fat encapsulated sodium carbonate are produced.

The yield of the fat encapsulated lysine is 1730 grams.

The yield of the fat encapsulated sodium carbonate is 670 grams.

The feed temperature is between 80° and 90° C.

EXAMPLE II

Production of Baked Goods Browning Mix

The objective of this experiment is to make a good browning mixture which works well on a pot pie or cookie in a microwave oven.

The degree of browning is expressed using the following system:

| | |
|---|---|
| very good browning | +5; |
| good browning | +4; |
| medium browning | +3; |
| weak browning | +2; |
| slight browning | +1; and |
| no browning | 0. |

Cookie dough is cut into 4 × 4 × 0.25" pieces.

0.4 Of a browning mix powder containing 20% proline, 5% ribose and 2% baking soda each encapsulated in fat via spray chilling was added onto each piece of cookie dough.

The cookie dough pieces were placed into a 700 watt microwave oven and the cookie dough pieces were cooked at medium power for 2 minutes.

Aesthetically pleasing, edibly browned cookies were produced.

Substantially, identical results were created using the following cookie browning coating mixtures:

| Ingredients | | Degree of Browning |
|---|---|---|
| EXAMPLE II-2 | | |
| Ribose | 25% | |
| Proline | 4% | |
| Baking Soda | 2% | +3 |
| EXAMPLE II-3 | | |
| Baking Soda | 4% | |
| Ribose | 5% | |
| Proline | 4% | +4 |
| EXAMPLE II-4 | | |
| Xylose | 10% | |
| Lysine | 10% | |
| Fructose | 25% | |
| 50:50 Ethanol:water | 55% | +4 |
| EXAMPLE II-5 | | |
| Ribose | 10% | |
| Fructose | 25% | |
| Baking Soda | 5% | |
| 50:50 Ethanol:water | 60% | +3 |
| EXAMPLE II-6 | | |
| Xylose | 5% | |
| Lysine | 15% | |
| Fructose | 25% | |
| Ethanol:water (50:50) | 55% | +4 |
| EXAMPLE II-7 | | |
| Proline capsules | 7% | |
| Ribose capsules | 8% | |
| Sodium bicarbonate all in glycerol | 1% | +4 |
| EXAMPLE II-8 | | |
| Ribose capsules | 14.2% | |
| Sodium bicarbonate capsules all in glycerol | 1.8% | +4 |
| EXAMPLE II-9 | | |
| Ribose capsules | 8.0% | |
| Sodium bicarbonate capsules all in glycerol | 8.0% | +4 |
| EXAMPLE II-10 | | |
| Ribose capsules | 15.5% | |
| Sodium bicarbonate capsules all in glycerol | 0.5% | +4 |
| EXAMPLE II-11 | | |
| Ribose | 48% | |
| Sodium bicarbonate all in 50:50 water-glycerol solution | 5% | +3. |

What is claimed is:

1. A process for producing a cooked edibly browned baked goods foodstuff consisting essentially of the steps of:
   (a) providing a particulate flowable flavoring powder consisting essentially of (A) separate individually, discretely encapsulated Maillard reaction reagents, said encapsulated Maillard reaction reagent being:
      (i) at least one encapsulated sugar optionally admixed with at least one Maillard reaction promoter;
      (ii) at least one encapsulated amino acid; and optionally;
      (iii) at least one encapsulated pH adjustment agent; and, optionally, (B), at least one Maillard reaction promoter;
   (b) providing an uncooked baked goods foodstuff containing more than 50% of water having an outer uncooked foodstuff surface;
   (c) placing in intimate contact with at least a major portion of said uncooked foodstuff surface a flavor augmenting, enhancing or imparting quantity of said particulate flowable flavoring powder thereby forming a flavoring powder-coated foodstuff surface; and
   (d) exposing the flavoring powder-coated foodstuff surface to microwave radiation for a predetermined controlled period of time;
   whereby the resulting product is caused to be edible as a foodstuff and the cooked, baked goods foodstuff surface is edibly browned.

2. The process of claim 1 wherein the particulate flowable flavoring powder is in the form of a slurry with a solvent composition which is capable of raising the dielectric constant of the foodstuff to be cooked whereby the foodstuff to be cooked is completely cooked and edibly browned in a period of time under 600 seconds 3. The process of claim 1 wherein the particulate flowable flavoring powder is prepared according to a process comprising the steps of:
   (i) heating a high melting point normally solid encapsulating material to melt the encapsulating material forming a molten encapsulating agent;
   (ii) separately mixing each of the Maillard reaction reagent containing components of said Maillard reaction reagent-containing composition with discrete individual portions of said molten encapsulating agent; and
   (iii) spray chilling or drum chilling the Maillard reaction reagent-containing composition to provide discrete particles of solid Maillard reaction reagent-containing agent.

4. The process according to claim 3 wherein the encapsulating material has a melting point of from 130° F. to 195° F.

5. The process according to claim 3 wherein the encapsulating material is a fat or wax having a melting point in the range of from 130° F. to 195° F.

6. The process according to claim 3 wherein the encapsulating material is at least one hydrogenated or partially hydrogenated vegetable oil, stearin, fatty glyceride ester or partial ester, or an edible wax.

7. The process according to claim 6 wherein the encapsulating agent is a partially hydrogenated cottonseed oil, a partially hydrogenated soybean oil, a partially hydrogenated palm oil, a glyceryl monostearate, a glyceryl monopalmitate, a propylene glycol monostearate, a polyglycerol stearate, a polyoxyethylene sorbitol, a fatty acid ester of polyoxyethylene sorbitan, a polyglycerol ester of a fatty acid, beeswax, or carnauba wax, paraffin wax or candellila wax.

8. The process of claim 1 wherein the particulate flowable flavoring powder is prepared according to a process comprising:
(i) heating a high melting point normally solid encapsulating material and at least one emulsifier to melt the encapsulating material and emulsifier;
(ii) admixing the melted encapsulating material and emulsifier;
(iii) separately mixing each component of the Maillard reaction reagent-containing composition with a texture conditioning agent;
(iv) separately mixing each component of the Maillard reaction reagent-containing composition and texture conditioning agent with discrete individual portions of the molten mixture of encapsulating agent and emulsifier to obtain homogeneous mixtures in the form of emulsions;
(v) mixing the resulting emulsions; and
(vi) chilling the resulting Maillard reaction reagent-containing composition to provide discrete particles of solid encapsulated Maillard reaction reagent-containing composition.

9. A process according to claim 8 wherein the texture conditioning agent is a silicon dioxide, powdered cellulose, puffed dextrin, maltodextrin, or pregelatinized starch.

10. A process according to claim 8 wherein the emulsifier is at least one mono or diglyceride of a fatty acid.

11. A process according to claim 8 wherein the encapsulating material has a melting point of from 130° F. to 195° F.

12. A process according to claim 8 wherein the encapsulating material is a fat or wax having a melting point in the range of from 130° F. to 195° F.

13. A process according to claim 8 wherein the quantity of Maillard reaction reagent-containing composition is from about up to about 40% of the weight of the homogeneous mixture.

14. A process according to claim 8 wherein the quantity of texture conditioning agent is from about 0.1 to about one times the amount of Maillard reaction reagent-containing composition.

15. A process according to claim 8 wherein the homogeneous mixture is chilled by spraying the mixture into a stream of gas, the gas having a temperature of from 40° F. to 116° F.

16. A process according to claim 15 wherein the spraying is carried out with a centrifugal atomizer.

17. A process according to claim 15 wherein the homogeneous mixture is admixed with compressed air and sprayed through a nozzle.

18. A process according to claim 3 wherein the mixture is chilled by contact with a surface at a temperature less than the melting point of the encapsulating material to form flakes.

19. A process according to claim 18 wherein the flakes are reduced in size to pass through a No. 10 screen.

20. The process of claim 2 wherein the solvent is selected from the group consisting of glycerine, propylene glycol, mixtures of glycerine and propylene glycol, mixtures of glycerine and ethanol, and mixtures of propylene glycol and ethanol.

21. The process of claim 1 wherein the sugar reactant is selected from the group consisting of rhamnose, xylose, arabinose, ribose, fructose and glucose and the amino acid reactant is selected from the group consisting of lysine, arginine, cysteine, methionine, yeast extract and hydrolyzed vegetable protein.

22. The process of claim 1 wherein one or more of the Maillard reaction reagents is in the form of particles which are reduced in size to pass through a 100 mesh screen prior to being encapsulated.

23. The process of claim 1 wherein encapsulated along with the sugar is a Maillard reaction promoter and wherein the Maillard reaction promoter is polyvinyl pyrrolidone.

24. The process of claim 1 wherein a Maillard reaction promoter is contained in the particulate flowable flavoring powder and the promoter is polyvinyl pyrrolidone.

* * * * *